United States Patent [19]

Kimpel et al.

[11] Patent Number: 5,582,200

[45] Date of Patent: *Dec. 10, 1996

[54] GATE VALVE WITH SPRING ASSISTED VALVE LINER

[75] Inventors: Alvin A. Kimpel, Edgerton, Wis.; Milton E. Jennings, Sparks, Nev.

[73] Assignee: Warman International, Ltd., Australia

[ * ] Notice: The term of this patent shall not extend beyond the expiration date of Pat. No. 5,413,140.

[21] Appl. No.: 435,835

[22] Filed: May 5, 1995

Related U.S. Application Data

[63] Continuation-in-part of Ser. No. 267,966, Jun. 29, 1994, Pat. No. 5,413,140.

[51] Int. Cl.⁶ .......................................... F16L 7/00
[52] U.S. Cl. ........................ 137/375; 251/367; 251/328; 251/174
[58] Field of Search ............................. 137/375; 251/327, 251/328, 174, 362, 360

[56] References Cited

U.S. PATENT DOCUMENTS

| | | | |
|---|---|---|---|
| 2,732,170 | 1/1956 | Shand | 251/172 |
| 2,873,943 | 2/1959 | Williams | 251/175 |
| 2,985,422 | 5/1961 | Anderson et al. | 251/172 |
| 3,006,599 | 10/1961 | Eckert, Jr. | 251/172 |
| 3,333,816 | 8/1967 | Williams et al. | 251/327 |
| 3,348,567 | 10/1967 | Volpin | 137/246.12 |
| 3,356,334 | 12/1967 | Scaramucci | 251/172 |
| 3,401,915 | 9/1968 | Kim | 251/174 |
| 3,463,447 | 8/1969 | Ripert | 251/158 |
| 3,478,771 | 11/1969 | Johnson | 137/242 |
| 3,497,177 | 2/1970 | Hulsey | 251/177 |
| 3,545,480 | 12/1970 | Gustafson | 137/375 |
| 4,257,447 | 3/1981 | Clarkson | 137/375 |
| 4,292,992 | 10/1981 | Bhide' | 137/340 |
| 4,377,274 | 3/1983 | Mayhew, Jr. | 251/327 |
| 4,491,144 | 1/1985 | Dreyer et al. | 137/240 |
| 4,603,864 | 8/1986 | Raftis | 277/12 |
| 4,688,597 | 8/1987 | Clarkson | 137/375 |
| 4,703,915 | 11/1987 | King | 251/328 |
| 4,742,990 | 5/1988 | Stalder et al. | 251/32 |
| 4,765,361 | 8/1988 | Clifford | 137/315 |
| 4,773,627 | 9/1988 | King et al. | 251/328 |
| 4,798,365 | 1/1989 | Mayhew | 251/205 |
| 4,846,442 | 7/1989 | Clarkson et al. | 251/328 |
| 4,895,181 | 1/1990 | McKavanagh | 137/375 |
| 5,020,776 | 6/1991 | Owens et al. | 251/327 |
| 5,082,247 | 1/1992 | Owens et al. | 251/326 |
| 5,090,661 | 2/1992 | Parks, Jr. et al. | 251/172 |
| 5,192,085 | 3/1993 | McOnie | 277/81 |
| 5,271,426 | 12/1993 | Clarkson et al. | 137/375 |
| 5,370,149 | 12/1994 | Clarkson et al. | 137/375 |

FOREIGN PATENT DOCUMENTS

| 744737 | 4/1933 | France . |
| 1046402 | 12/1953 | France . |

OTHER PUBLICATIONS

The Clarkson Company KGA Valve Selection and Ordering Guide.

Primary Examiner—A. Michael Chambers
Attorney, Agent, or Firm—Lathrop & Clark

[57] ABSTRACT

The valve assembly 20 has two housing halves 22 which are bolted together to form a housing 24 for two resilient valve liners 26 with coaxial through passages 28 for the flow of fluids through the assembly. A metal gate 30 selectively blocks the through passages 28. Each valve liner 26 has a radially extending flange 32 in which is embedded a frustoconical metal spring 34 which biases the flanges against the gate 30 and retains a seal about the gate in a valve closed configuration. The assembly has a split seat formed by two seat inserts 36 retained in the housing halves 22 beneath the valve liners 26. The seat inserts 36 are open to the bottom of the housing 24 and permit debris to be ejected from the valve assembly 20. The spring may be formed to have ends which are not connected and positioned by inserting a locator tab on the exterior flange of the liner into a corresponding depression in the valve housing.

11 Claims, 10 Drawing Sheets

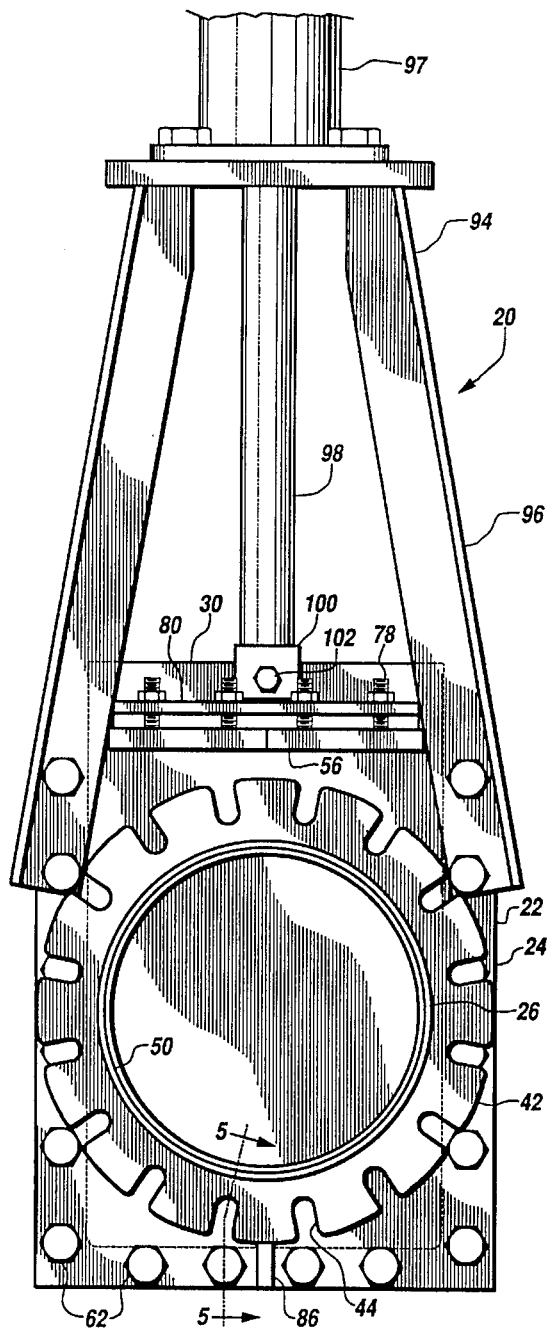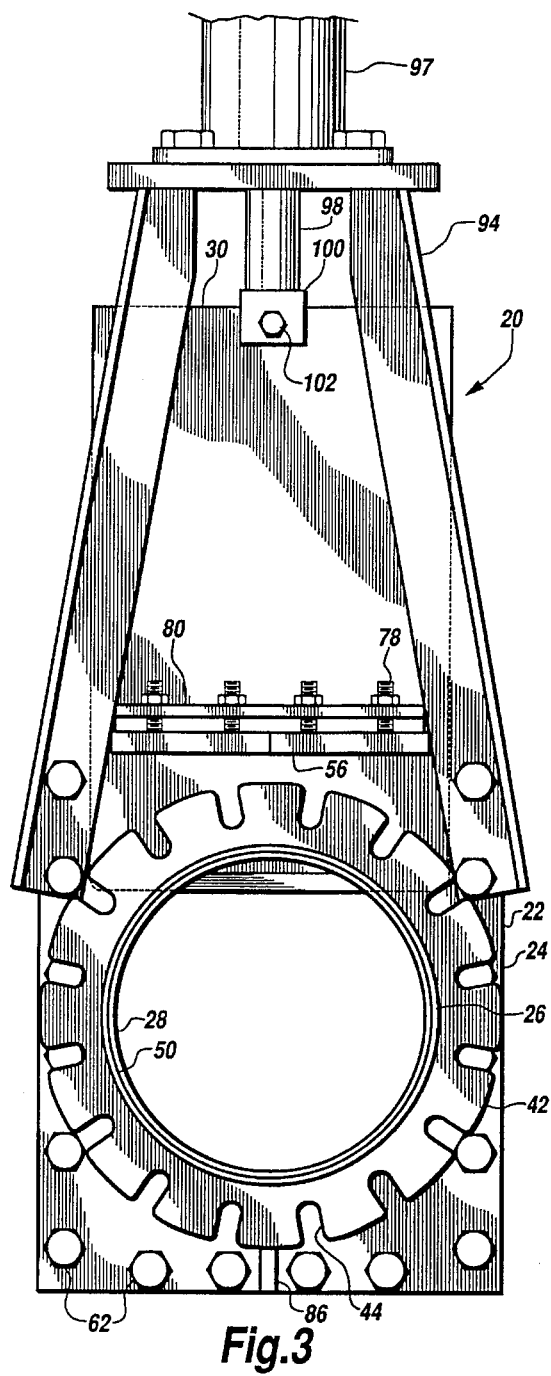

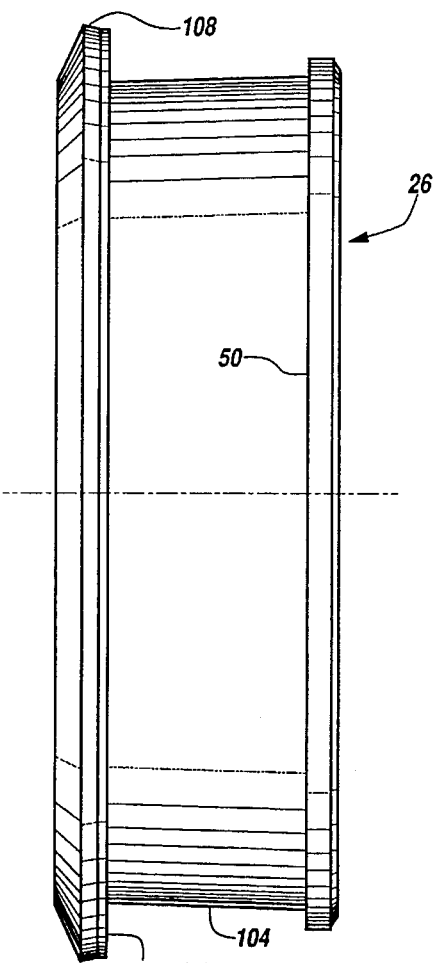
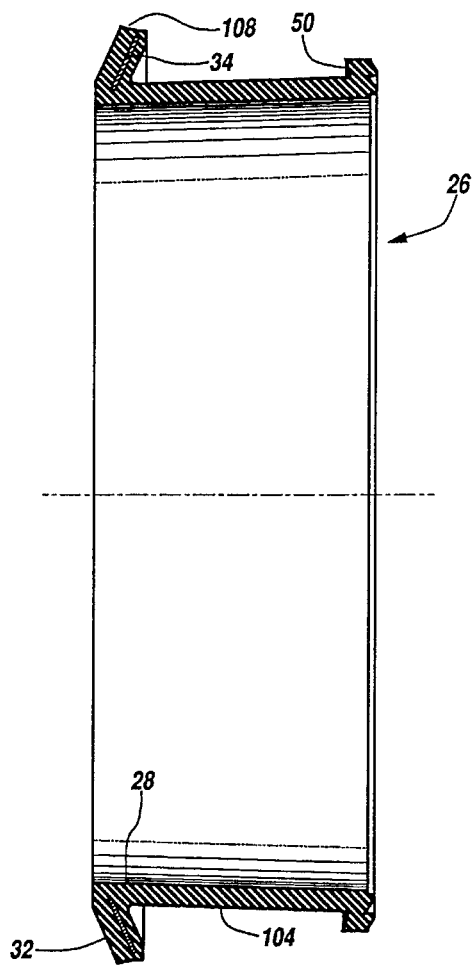
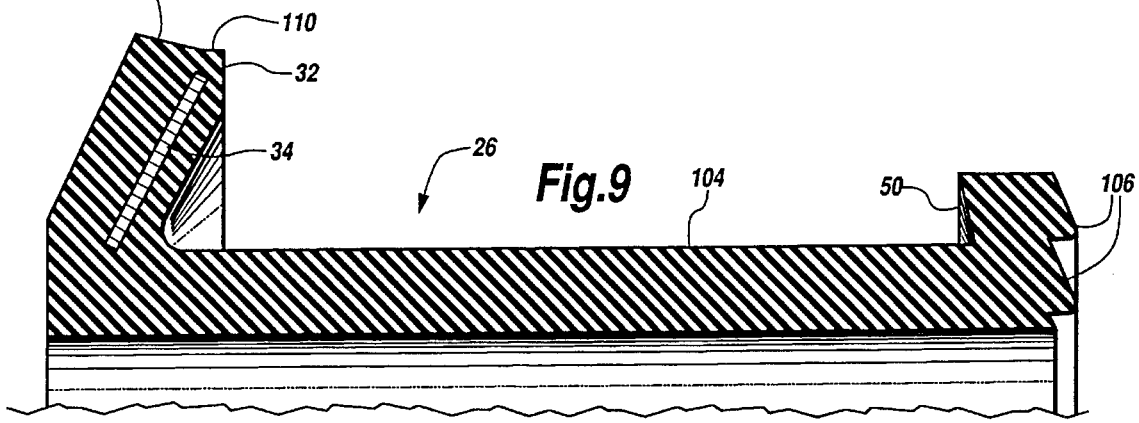

5,582,200

GATE VALVE WITH SPRING ASSISTED VALVE LINER

This application is a continuation-in-part of U.S. application Ser. No. 08/267,966, filed Jun. 29, 1994 now U.S. Pat. No. 5,413,140.

FIELD OF THE INVENTION

The present invention relates to valves in general, and to gate valves in particular.

BACKGROUND OF THE INVENTION

Gate valves are positioned in pipe line systems to control the flow of liquids and slurdes. The diameter of the pipeline, and hence the gate valve, will depend on the consistency and volume of the fluid controlled. Higher volume fluid flows will require larger gate valves. One well known type of gate valve employs two generally cylindrical molded rubber valve liners which are coaxially aligned to define a flow passage for the controlled liquid. The valve liners typically have flanges which retain the liners within metal housings. A metal plate is cycled between the two liners to close off fluid flow. In passing between the liners the rubber is deformed to tightly engage against the gate and maintain the required seal. Such a seal has been effectively employed in a number of gate valve models. However, as the diameter of the valve passage is increased, the forces on the rubber and the degree of compression required to maintain a suitable seal increases. A greater compression of the rubber may cause accelerated wear on the liners. Use of thicker rubber liners is more costly and also presents additional problems of controlling and retaining the desired liner shape.

Gum rubber based elastomers can be compounded to have good resilient properties for conventional gate valve designs. Gum rubber valve liners are acceptable for use with fluids at ambient temperatures which contain only mild corrosives and no oil. However, at high temperatures or in highly corrosive environments, non-rubber elastomers are required which have less than satisfactory resilient properties.

Rigid metal rings having a right-angle cross section have been molded within the valve liners or connected to the interior face of the liner to restrict deformation or shield the rubber from contact with the moving gate respectively Gate valve assemblies having liners which employ a downwardly extending tab which form a split seat to retain the gate in the closed position have been effectively used to prevent fluid release in the course of valve cycling.

What is needed is a gate valve assembly which may be manufactured economically in many sizes, which is durable and performs predictably and may be fabricated to sustain high temperature and corrosive environments.

SUMMARY OF THE INVENTION

The gate valve assembly of this invention has two housing halves which are bolted together to form a housing for two resilient valve liners with coaxial through passages for the flow of fluids through the assembly. A metal gate travels vertically within the housing to selectively block the through passages. Each valve liner has a radially extending flange in which is embedded a frustoconical metal spring which biases the flanges against the gate and retains a seal about the gate in a valve closed configuration. The assembly has a split seat formed by two seat inserts retained in the housing halves beneath the valve liners. The seat inserts are open to the bottom of the housing and permit debris to be mechanically ejected from the valve assembly by the lower knife edge of the metal gate. Because the resilience of the liners is primarily determined by the spring, the liner elastomer may be selected to suit the application environment, opening up special purpose elastomers to uses where their reduced elasticity formerly made them impractical. Alternatively, a spring may be placed within the housing exterior of each valve liner flange. For economy of production, the frustoconical metal spring may be formed from a sheet of bar stock to have two ends which are not connected. The valve liner with the split spring ring is positioned by inserting a locator tab on the exterior flange of the liner into a corresponding depression in the valve housing.

It is an object of the present invention to provide a gate valve with liners of extended wear life.

It is another object of the present invention to provide a gate valve which is easily serviced.

It is a further object of the present invention to provide a gate valve which will operate at elevated temperatures and pressures and in corrosive environments.

It is a still further object of the present invention to provide a gate valve which permits matter trapped beneath the gate blade to be ejected from the valve without fluid leakage.

Further objects, features and advantages of the invention will be apparent from the following detailed description when taken in conjunction with the accompanying drawings.

BRIEF DESCRIPTION OF THE DRAWINGS

FIG. 2 is a front elevational view of the gate valve assembly of this invention in a closed configuration FIG. 3 is a front elevational view of the gate valve of FIG. 2 in a partially opened configuration.

FIG. 7 is a side elevational view of the valve liner of FIG. 6.

FIG. 8 is a cross-sectional view taken along section line 8—8 of the valve liner of FIG. 6.

FIG. 9 is an enlarged partial cross-sectional view of the valve liner of FIG. 8.

DESCRIPTION OF THE PREFERRED EMBODIMENTS

Figure 1:
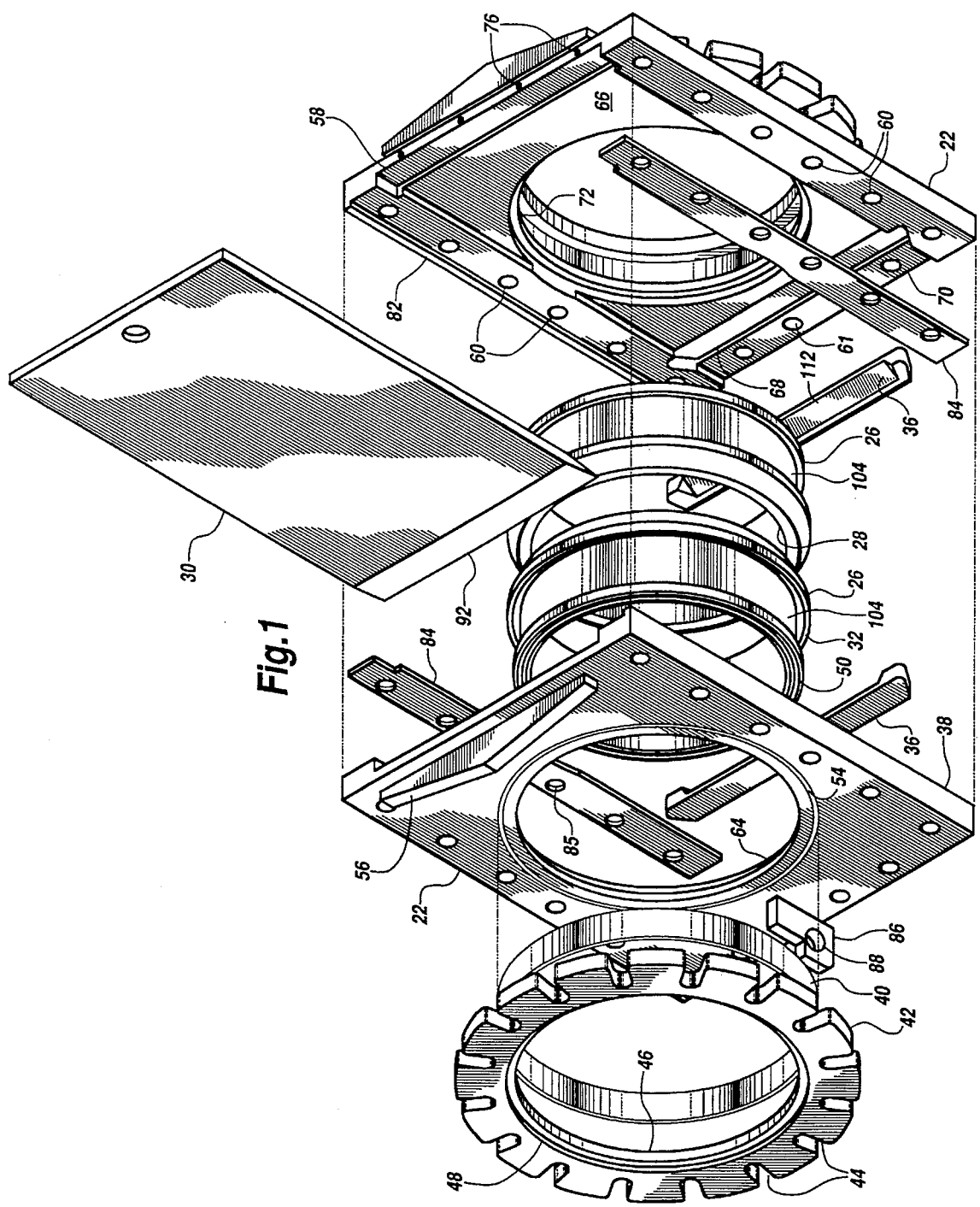
FIG. 1 is an exploded isometric view of portions of the gate valve assembly of this invention.

Referring more particularly to FIGS. 1–17, wherein like numbers refer to similar parts, a gate valve assembly 20 is shown in FIG. 1 for control of fluid and slurry flows in a pipe conduit (not shown). The valve assembly 20 has two housing halves 22 which are bolted together to form a housing 24 for two resilient valve liners 26 with coaxial through passages 28 for the flow of fluids through the assembly. A metal gate 30 travels vertically within the housing 24 to selectively block the through passages 28. Each valve liner 26 has a radially extending flange 32 in which is embedded a frustoconical metal spring 34 which biases the flanges against the gate 30 and retains a seal about the gate in a valve closed configuration. The assembly has a split seat formed by two seat inserts 36 retained in the housing halves 22 beneath the valve liners 26. The seat inserts 36 are open to the bottom of the housing 24 and permit debris to be ejected from the valve assembly 20. The valve assembly 20 is of the ranged full body type. Effective valves according to this invention may be fabricated over a wide range of diameters. The illustrated valve assembly 20, has an exemplary fluid openings of sixteen inches. It should be further noted that valves of this invention may also be manufactured in a wafer face to face dimension as described in MSS SP-81.

The valve housing halves 22 are identical metal assemblies. As shown in FIG. 1, each housing half has a machined steel inner plate 38 which is connected by a cylindrical steel ring 40 to an outer machined steel flange 42. The ring 40 is preferably welded to both the inner plate 38 and flange 42 to form a single liquid-tight housing half 22. The housing flange 42 is formed of steel plate approximately two inches thick and has formed therein sixteen equally spaced slots 44 which receive bolts (not shown) to connect the valve assembly 20 to the flanges of a pipeline conduit section (also not shown). As shown in FIG. 2, each slot is preferably formed to be of greater width as the slot extends radially outwardly in such a way as to accept conduit sections of differing standard fastener size and position. For example, a single slot may accept ANSI Standard, British Standard, or German DIN conduit. Alternatively conventional straight slots or tapped holes could be employed. The housing flange 42 has a central hole 46 and an exterior counterbore 48 which surrounds the central hole and which receives the exterior flange 50 of a valve liner 26. An interior counterbore 52 is formed on the housing flange 42 to receive the ring 40.

As shown in FIG. 1, a circular slot 54 is formed on the exterior of the housing half inner plate 38 which receives the ring 40. A generally triangular steel strongback plate 56 is welded to the top of the inner plate 38 and serves to stiffen the inner plate 38 in a region adjacent a packing slot 58 formed on the interior of the inner plate. Six fastener holes 60 are arrayed on each side of the inner plate 38 and extend through the plate. Four fastener holes 61 are arrayed on the bottom of the inner plate 38. Bolt fasteners 62 extend through the fastener holes 60, 61 in both housing halves 22 to connect the halves together. The fasteners 62 extending through the lower holes 61 extend through cylindrical spacers 63 which prevent over-tightening of the housing halves 22. A circular central bore 64 extends through the inner plate 38 and is coaxial with the central hole 46 in the housing flange and the ring 40. A vertical gate slot 66 extends beneath the packing slot 58, across the central bore 64 to the bottom of the housing 24. The gate slot 66 provides clearance for the metal gate 30 to close and open the valve. A generally trapezoidal seat slot 68 extends horizontally beneath the central bore 64 and receives the seat insert 36 therein. The portion 70 of the gate slot 66 which extends beneath the seat slot 68 provides an exit for particulate material from the seat inserts 36. A counterbore 72 is formed on the interior of the inner plate 38 and receives the inner flange 32 of the valve liner 26. Four blind threaded holes 76 are tapped in the top of the inner plate 38 outward of the packing slot 58. The blind holes 76 receive fasteners 78 which connect the packing compressor 80 to the valve housing 24. A narrow lip 82 is formed on one side of the inner plate 38. Each lip 82 engages against a vertical surface on the opposite housing half 22. The thickness of the lips 82 determines the maximum compression of the gaskets 84 which seal the sides of the housing 24.

An L-shaped gusset 86 protrudes outwardly from the exterior face of the inner plate 38 beneath the ring 40 and the housing flange 42. The gussets 86 permit the valve assembly to stand up vertically on a horizontal support surface during servicing or prior to installation in a pipeline. Each gusset 86 has a connector hole 88 for engagement of a lifting cable or the like.

A liquid-tight seal is formed around the periphery of the valve housing 24 by the coaction of top packing 89, the two side gaskets 84, and the bottom seat inserts 36. The side gaskets 84, best shown in FIG. 1, are preferably formed of sheet rubber of 60A Durometer and approximately twelve hundredths of an inch thick. The gaskets 84 have holes 85 which are aligned with the fastener holes 60 and through which the fasteners 62 extend. The top packing 89 is preferably three strips of a braided packing material such as GFO manufactured by Gore Fiber. The opposed packing slots 58 define a packing chamber 90 at the top of the housing 24 which receives the top packing 89. The top packing 89 surrounds the gate 30 as it is raised and lowered.

The gate 30 is a rectangular plate, preferably flat to within a sixteenth of an inch, and in an exemplary embodiment three quarters of an inch thick. The gate 30 has a fifteen degree double beveled blade 92. A frame 94 formed of four connected inclined angle brackets 96 extends upwardly from the housing 24 and supports a hydraulic actuator 97. The actuator 97 has an extensible piston rod 98 which travels vertically and which has a clevis 100 which connects the gate 30 to the piston rod 98. A clevis pin 102 connects the gate 30 to the clevis 100. The gate 30 travels on the piston rod 98 from a valve closed position, shown in FIG. 2, to a valve open position in which the gate is fully elevated.

The resilient valve liners 26, best shown in FIGS. 6–9, are preferably formed of natural gum rubber of 70 A durometer for most applications. However, as discussed below, the valve liners may be formed from different elastomers for different applications. Each liner 26 is an axisymmetric article preferably formed through conventional transfer molding processes. As best shown in FIG. 9, each valve liner 26 has an annular central body 104 having an inner flange 32 which is engaged against the opposed valve liner 26 between the two housing halves 22. An exterior flange 50 is engaged with the exterior counterbore 48 on the housing flange 42. The valve liner body 104 defines the through passage 28 which constitutes the path of fluid flow through the valve assembly 20. The through passage 28 narrows toward the interior of the liner 26. This narrowing is provided to facilitate removal of the molding from the mold and is not necessary to performance of the valve.

Two protruding seal ridges 106 extend outwardly from the liner flange 50 and are compressed against the attached pipe conduit to form a fluid-tight seal between the conduit and the valve assembly 20.

As shown in FIG. 9, the flange 32 of the valve liner 26 is raked outwardly at an angle of approximately sixty-five degrees. This inclination of the inner flange 32 corresponds approximately to the undetected angle of the frustoconical spring 34 which is molded within the liner 26. The disc spring 34 is formed of an appropriate material, for example 17-7 PH stainless steel. Fiberglass or other composite material could also be employed. Springs of this type, commonly referred to as "Belleville" springs, are manufactured by Rolex Company of Hillside, N.J. The inner flange 32 has a radially outwardly protruding wedge segment 108 which engages with the counterbore 72 on the inner plate 38 of the valve housing half 22. The wedge segment 108 preferably extends from the right-angle outer rim 110 of the liner flange 32 at an angle of about eleven degrees.

Figure 10:
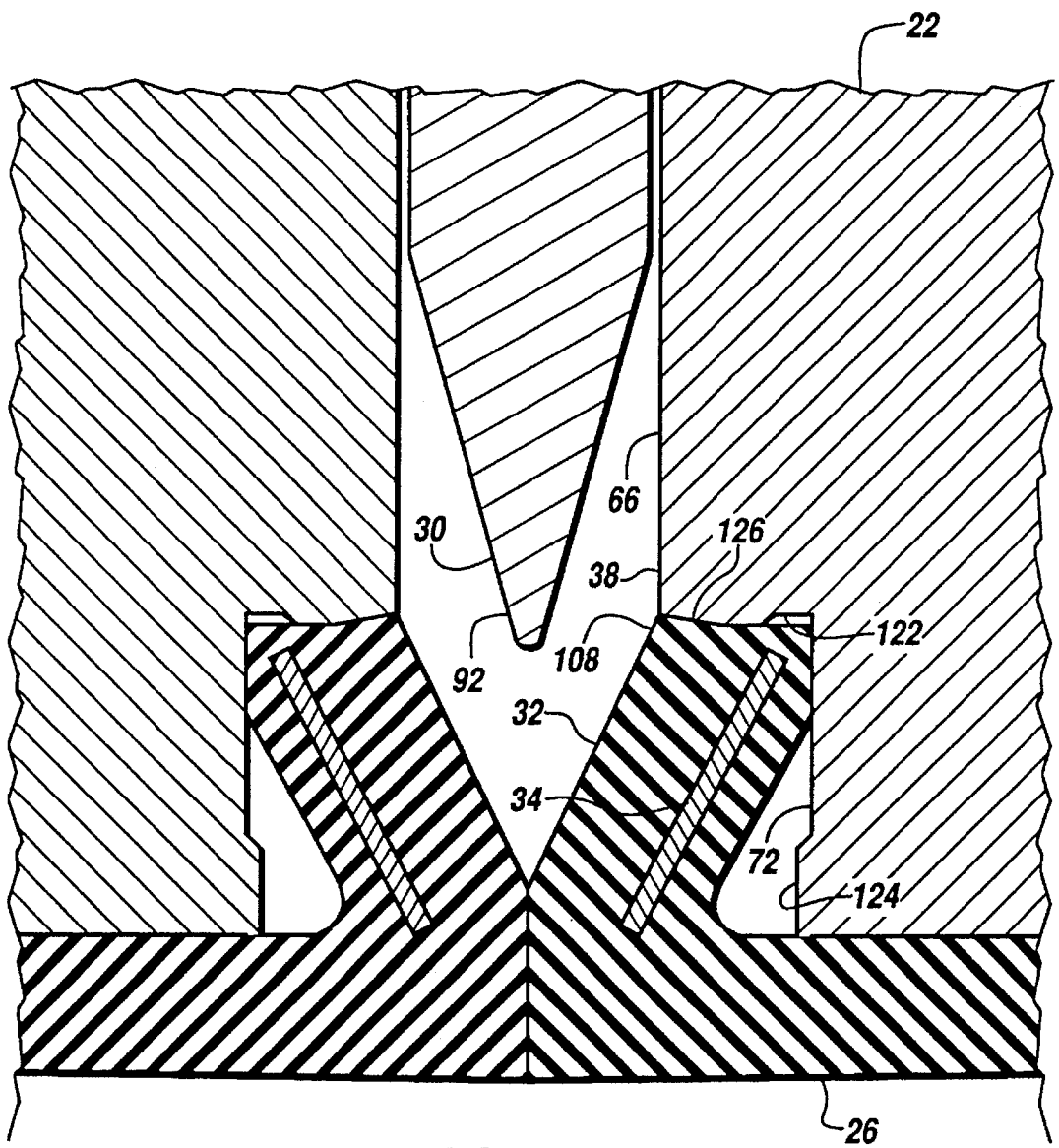
FIG. 10 is an enlarged cross-sectional view of the gate valve of FIG. 4 taken at detail 10.

The counterbore 72 has an exterior relieved radially extending portion 122, shown in the detail of FIG. 10, which allows the inner flange 32 rubber to flow radially outwardly as the gate is closed. The closing of the gate compresses the elastomer of the liner. Furthermore, the deflection of the spring 34 tends to cause the external diameter of the spring to move outwardly. The relieved portion 122 provides a relief for the rubber displaced by this motion of the spring. To further restrict the spring 34 from going past a vertical orientation and possibly assuming a reversed orientation, a slightly protruding annulus 124 is machined within the counterbore 72 which in a gate closed position will engage against the inner flange 32. To facilitate insertion of the liner 26 into the counterbore 72, an inwardly opening chamfer 126 is machined to receive the wedge portion 108 of the liner. However, this chamfer 126 holds the wedge portion in compression in both a gate open and gate closed configuration. A chamfer 127 formed on the housing halves 22 provides clearance for the radiused connection between the flange 32 and the body 104 of the liner when the gate is closed.

Figure 5:
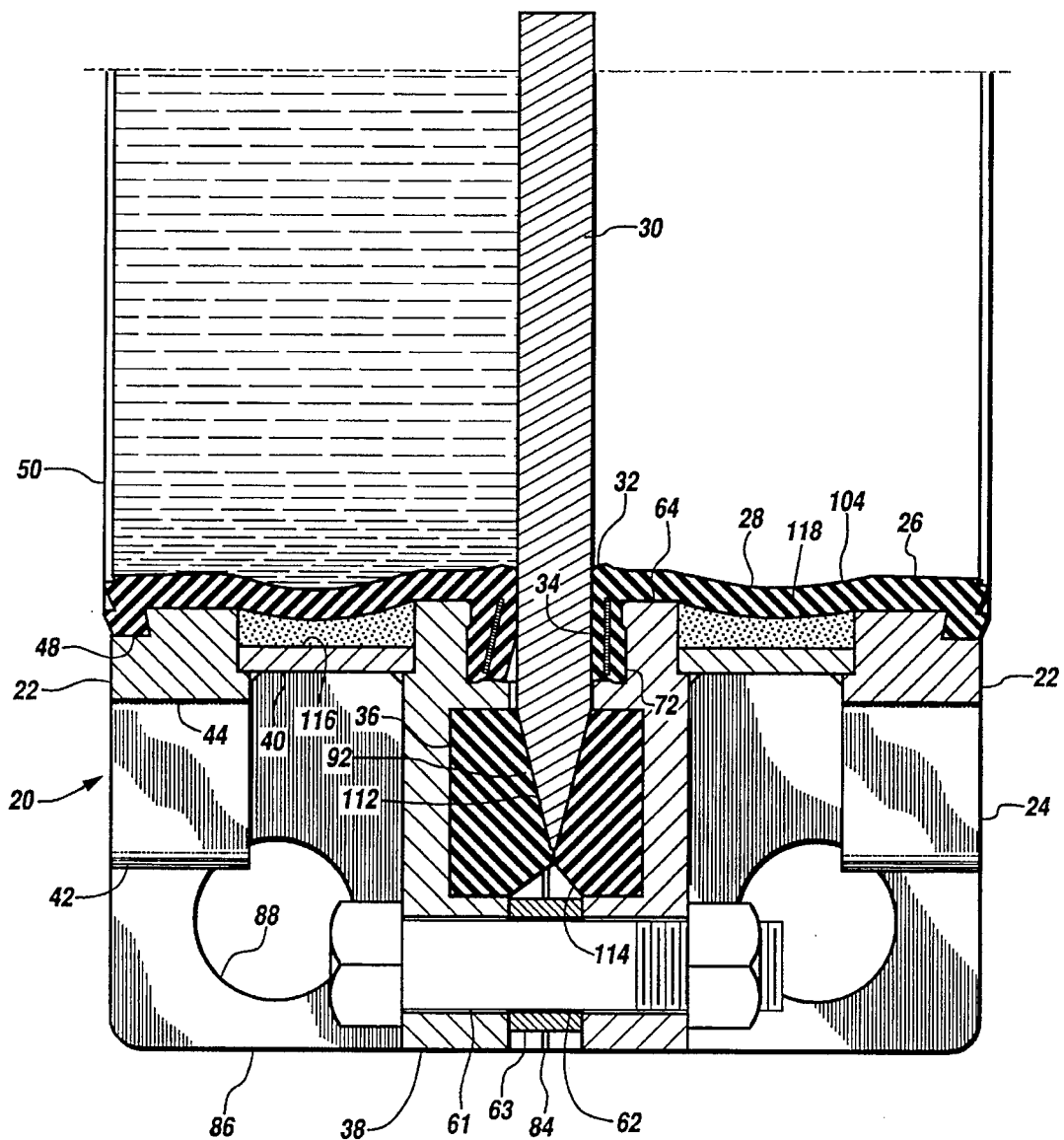
FIG.5 is fragmentary cross-sectional view of the lower portion of the gate valve of FIG. 2 taken along section line 5—5.
Figure 6:
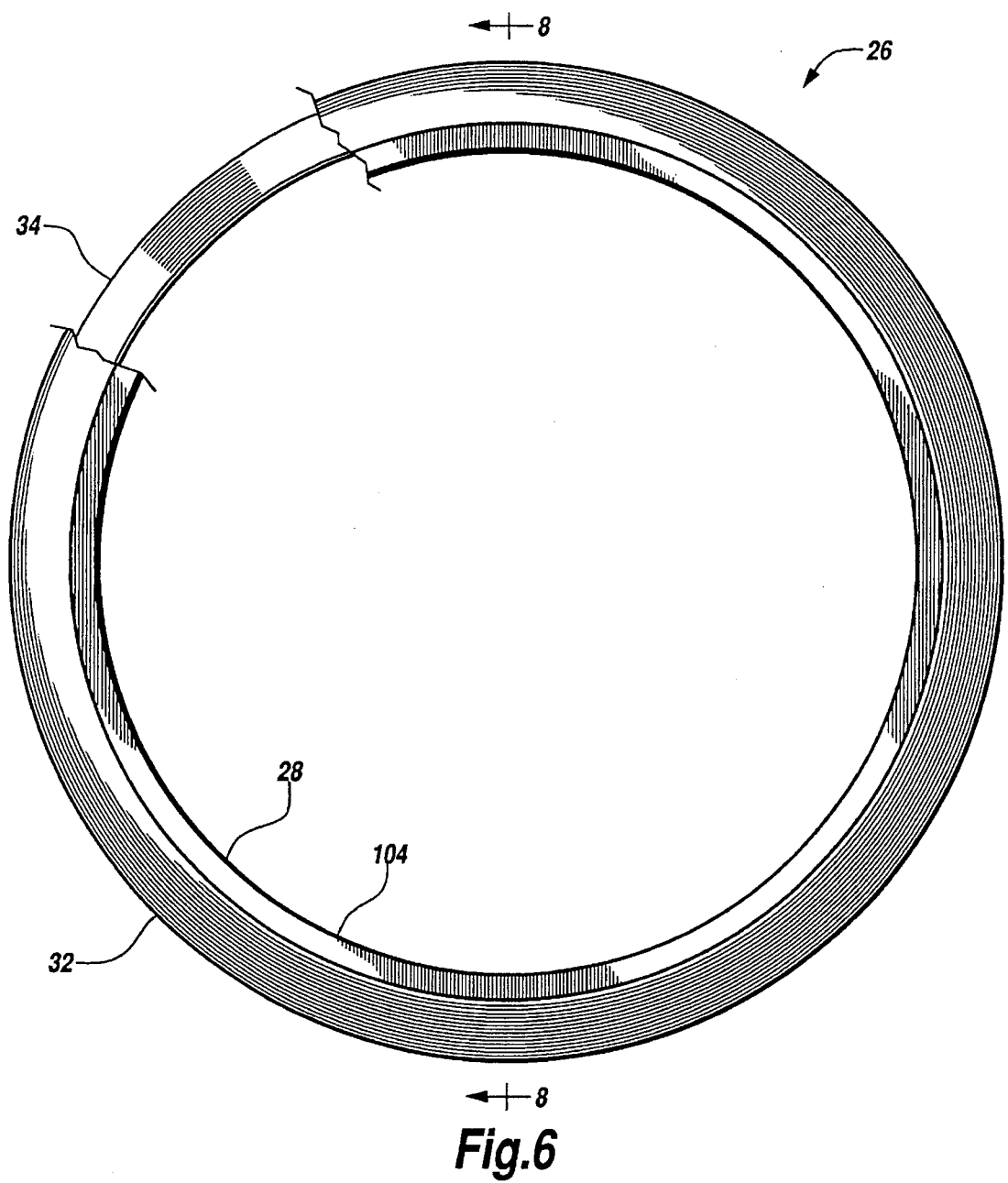
FIG. 6 is a front elevational view of the valve liner of the gate valve of FIG. 2, partially broken away to reveal the frustoconical spring molded therein.

The seat inserts 36, shown in FIGS. 1 and 5, are molded of rubber preferably of about 65A Durometer. Each insert 36 has an entry bevel 112 on the upper portion of the insert which receives the blade 92 of the gate 30 and guides it into a seat between the two inserts 36. An outlet bevel 114 is provided on the bottom portion of the insert 36 to facilitate the escape of debris from between the inserts.

An annular groove 116 is defined in each housing half 22 between the housing flange 42 and the inner housing plate 38 and bounded by the ring 40. A closed cell foam ring 118 is positioned within each groove 116 and fills the volume between the ring 40 and the valve liner body 104. The foam ring 118 reduces the amount of liquid which accumulates exterior to the valve liner yet is compressible to permit the valve liner body to deform into the groove 116.

Whereas a conventional valve liner relies exclusively on the resilience of the rubber to maintain a seal with the gate, the valve liner 26 relies primarily on the disc spring 34. The force deflection performance of a disc spring is particularly advantageous within a liner, because as the disc spring is deflected outwardly by the downward motion of the gate the force required to further advance the gate between the liners is kept nearly constant or reduced.

Figure 4:
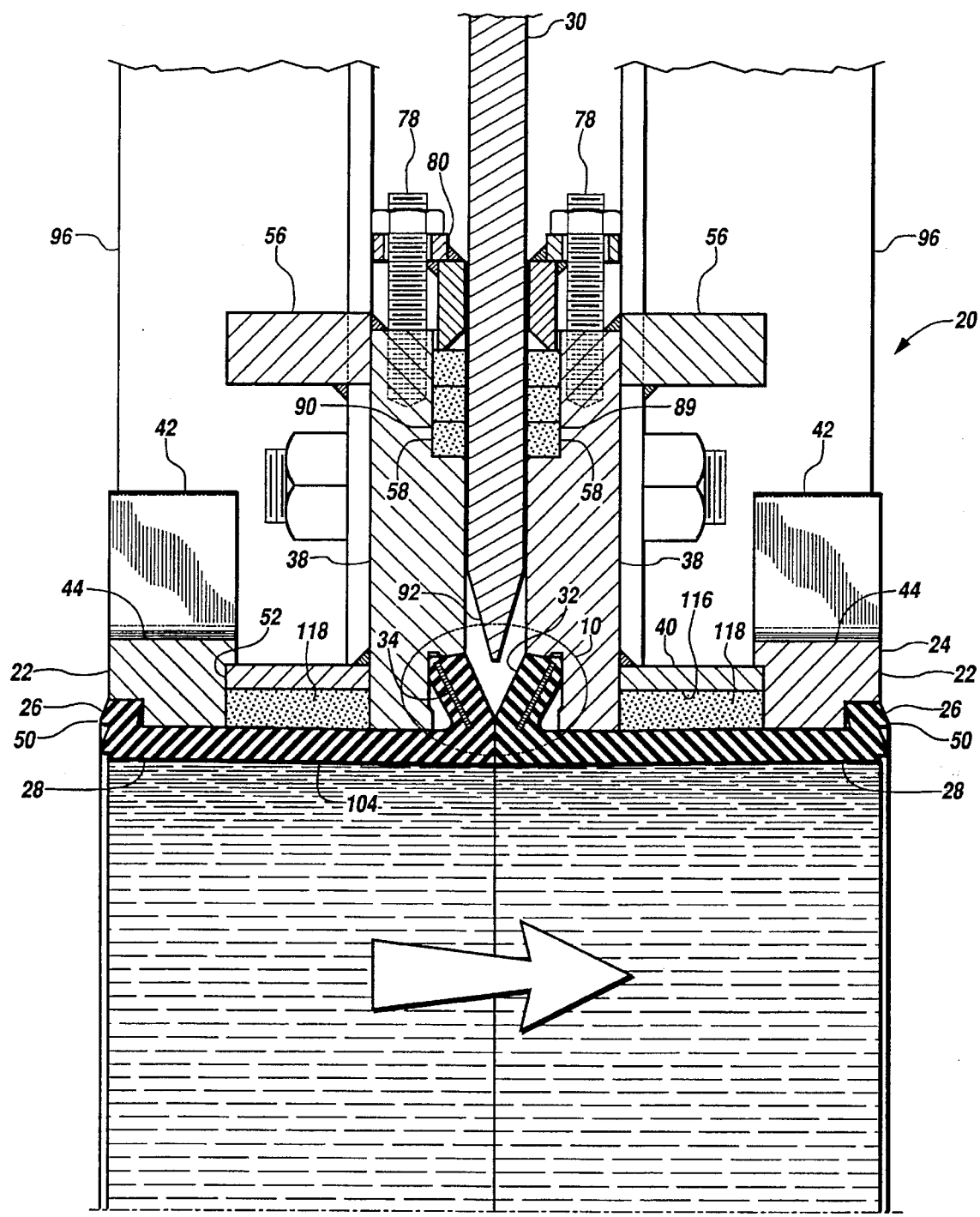
FIG. 4 is a fragmentary cross-sectional view of the upper portion of the gate valve of FIG. 2 in an open condition.

Operation of the gate valve assembly. 20 is best illustrated by comparing the valve in an open configuration, as shown in FIG. 4, and a closed configuration as shown in FIG. 5. In the gate open position, the gate 30 is parked with the blade 92 within the housing 24 but above the inner flanges 32 of the valve liners 26. The inner flanges 32 are compressed against one another to form a circumferential seal around the coaxial through passages 28 of the liners 26. A secondary seal is formed by the packing 89 above the liners, the gaskets 84 to the sides of the liners and the seat inserts 36 beneath the liners. To close the valve assembly 20, the actuator 97 is operated to drive the gate 30 between the inner flanges 32 of the adjoining valve liners 26. The beveled blade 92 of the gate 30 serves to part the valve liners as the gate descends.

The rubber of the valve liners 26 is retained in tight engagement with the metal gate by the springs 34 which are embedded within the inner flanges 32 of the liners. The frustoconical springs 34, which are inclined outwardly in the valve open configuration, take on a more nearly vertical orientation as the gate compresses the rubber of the flanges and moves between the two liners 26. As shown in FIG. 5, when the gate 30 has closed off the coaxial through passages 28 of the liners 26, each rubber inner flange 32 is compressed to nearly completely fill the volume between the blade and the counterbore 72 on the inner plate 38 its respective housing half 22. The metal of the housing half which defines the counterbore 72 prevents the spring 34 from being deformed past a vertical orientation and hence prevents reversal of the spring. The rubber of the liners which is displaced by the closing of the gate 30 may dimple somewhat and extend outwardly into the annular grooves 116 which are filled with the foam 118. By providing a volume for rubber displaced by the gate the grooves 116 reduce the overall compression of the valve liner rubber and would be expected to contribute to extended wear life. As shown in FIG. 5 the valve is in a fully closed configuration when the blade 92 of the gate 30 is parked between the two rubber seat inserts 36.

The gate 30 in a preferred embodiment does not protrude beneath the seat inserts 36. Particulate matter trapped beneath the gate 30 when the valve is closed will be advanced between the valve liners and will be lodged within the seat inserts 36. Over time with repeated cycling of the valve 20 the particulate matter will work through the seat inserts 36 and will be discharged beneath the valve housing 24.

The valve liners of this invention, by employing a mechanical spring to supply the required compressive seal, yields a greater design freedom in designing a gate valve for a particular application. The gate valve designer is not limited in his elastomer choice to rubber. Other elastomers, such as viton, neoprene, chlorobutyl, nitrile, and others may be employed to suit a particular application without significantly affecting sealing force. Some non-rubber elastomers, for example fluoroelastomers such as Teflon and Viton, have reduced resilience which makes their use impractical in conventional gate valve designs. However, non-rubber elastomers often have desireable properties; i.e.: fluoroelastomers operate at high temperatures and are resistant to corrosion. Because the sealing force in the valve of the present invention is primarily controlled by the dimensions and physical characteristics of the spring disc, non-rubber elastomers may be employed with satisfactory results. Furthermore, the spring disc serves to maintain seal shape integrity and compensate for the effects of elastomeric compression set which is experience when the valve is opened after being closed for a significant period of time. Compression set, which varies from elastomer to elastomer, will be overcome by the reserve mechanical force applied by the spring disc. In addition, the effect of compression set is less significant in the liners of the present invention because a significantly reduced valve liner thickness is required. The valve liners are compressed together when the gate is up to contain the design load pressure of the valve assembly. In an exemplary assembly, the reserve displacement of the liners is approximately 1/16 inch on each liner.

Figure 11:
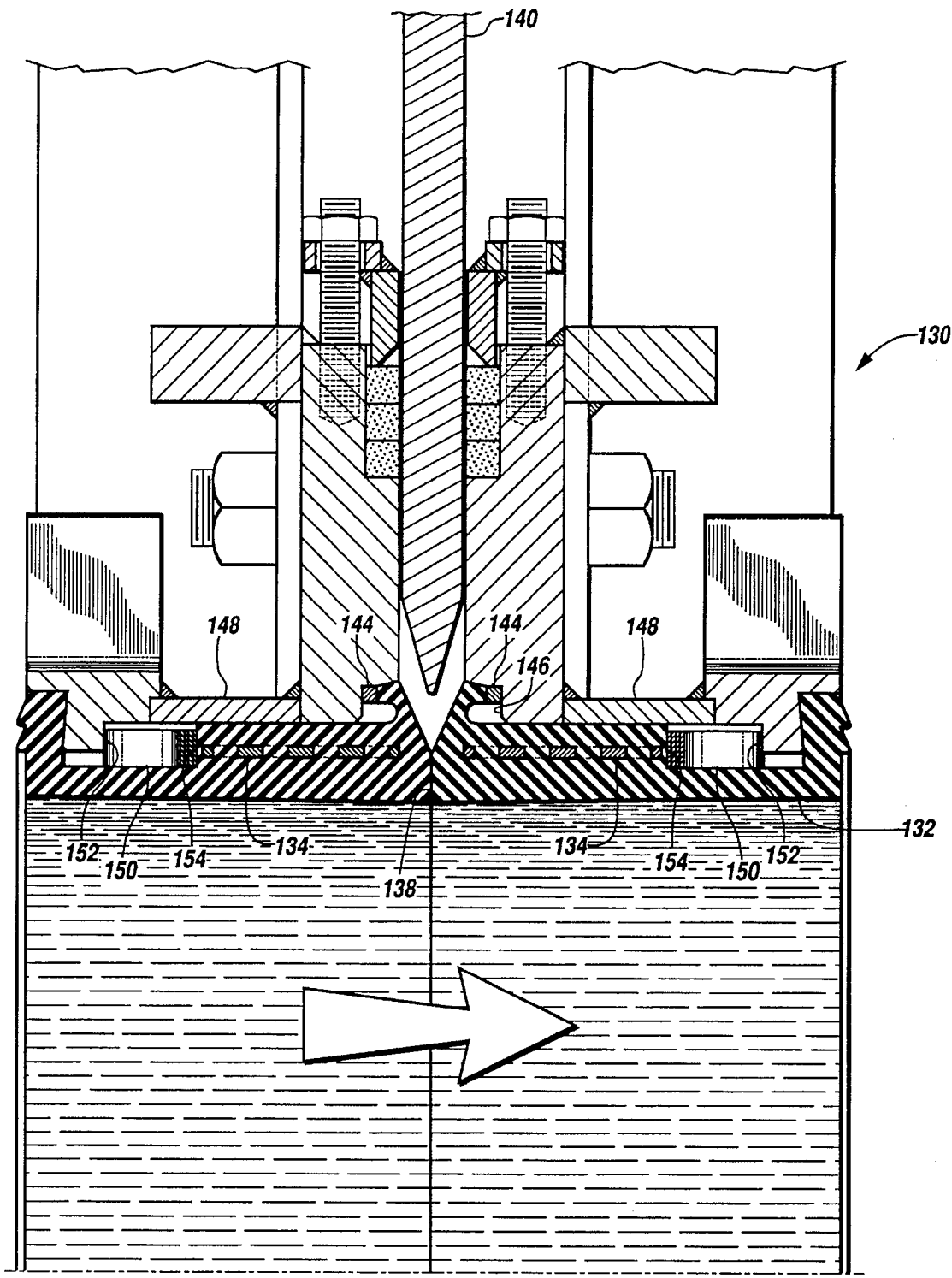
FIG. 11 is a fragmentary cross-sectional view of the upper portion of an alternative embodiment gate valve of this invention in an open condition.
Figure 12:
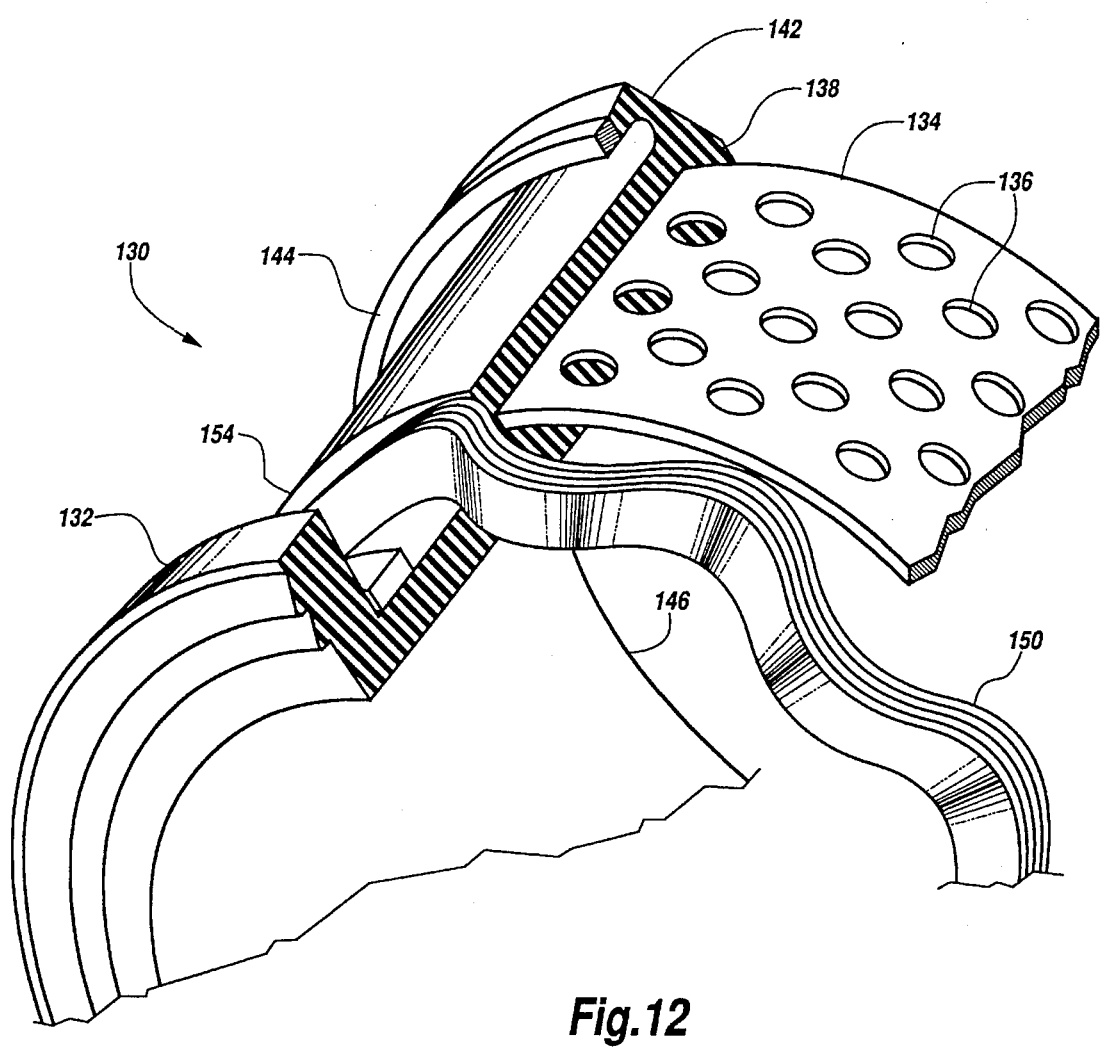
FIG. 12 is a fragmentary isometric view of the gate valve liner and spring of FIG. 11.

An alternative embodiment gate valve assembly 130 is shown in FIGS. 11 and 12. The gate valve 130 has a two valve liners 132 which each have an embedded cylindrical reinforcing ring 134. The rings 134 are preferably formed with a number of circular openings 136, shown in FIG. 12, to facilitate molding and to obtain a good bond between the ring 134 and the elastomer liner 132. As shown in FIG. 11, each valve liner 132 has an inner face 138 which engages against the valve gate 140 when the gate is moved between the liners. Each valve liner 132 has a radially outwardly extending flange 142 which has an outward bevel to receive the gate 140. A split snap ring 144 is bonded to the flange 142 and serves to retain the flange 142 within a counterbore 146 formed on the inner face of the housing half 148.

The spring assist for the valve assembly 130 is provided by wave springs 150 which extend between an abutment 152 formed on the housing half 148 and an outwardly facing surface 154 of the valve liner 132 which is closely spaced from the ring 134. The wave spring 150 may be any conventional wave spring, such as the Nested Spirawave spring manufactured by Smalley Steel Ring Company of Wheeling, Ill. An exemplary wave spring is formed from flat wire of 0.062 inch thickness, with nine waves in the ring, and four thicknesses of wire. An exemplary free height between the innermost hill and the outermost valley of the spring is 1.290 inches. The spring force of the wave spring 150 is carried by the ring 134 to the inner face 138 of the valve liner 132 to cause the inner face to engage against the gate 140. It should be noted that the other springs may be substituted for the wave spring, for example multiple nested Belleville springs, or an assemblage of coil springs.

Figure 14:
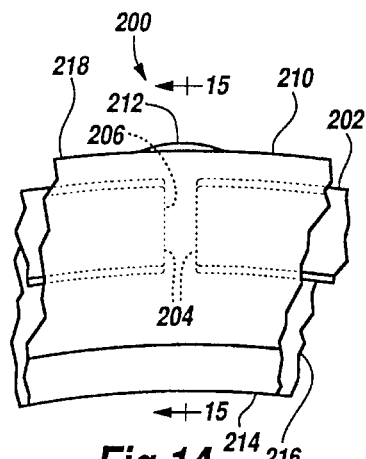
FIG. 14 is a fragmentary inside elevational view of the valve liner of the valve of FIG. 13.
Figure 13:
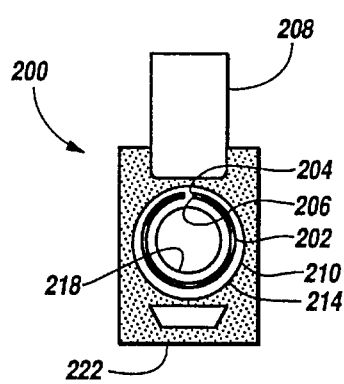
FIG. 13 is a schematic view of an alternative embodiment narrow body valve of this invention having a split frustoconical spring and a locator tab for orienting the split with respect to the valve housing.

Belleville type springs are typically made from sheet stock, which, in larger diameters of springs, results in considerable material waste. Cost may be reduced, and springs of exceptionally large diameter may be obtained, by forming the frustoconical spring from a discontinuous split ring as in the valve assembly 200, shown in FIGS. 13–17. Such springs may be especially advantageous in valves having through openings greater than 36 inches in diameter, and generally in larger diameter valves, where the cost of fabricating the frustoconical spring becomes significant. The split ring spring 202 functions as a spring and has a discontinuous frustoconical shape, substantially the same as the frustoconical springs disclosed above but with a split or gap. As shown in FIGS. 13 and 14, the spring 202 has two ends 204 which are spaced from one another and define a gap 206 therebetween. The spring 202 may be formed by rolling edgewise a rectangular wire or flat bar in a manner similar to the manufacture of a coil spring. This manufacturing process produces very little waste and is commercially available from Smalley Steel Ring Company of Wheeling, Ill., under the product designation "spiral retaining ring, dished." The split joint between the ends 204 may be a simple gap as shown, or the ends may overlap. In those applications where a single wrap of wire produces less than the requisite axial spring force for optimal valve function, the overlap between the ends can be increased to a fraction of a turn or more than a single turn.

Figure 15:
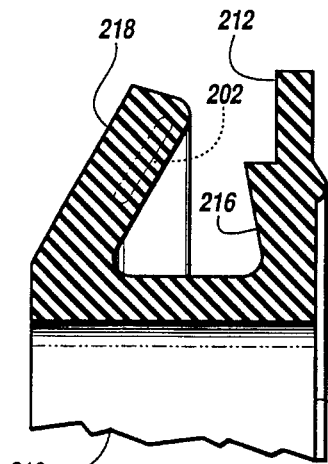
FIG. 15 is a fragmentary cross-sectional view of the valve liner of FIG. 14 taken along section line 15—15.
Figure 16:
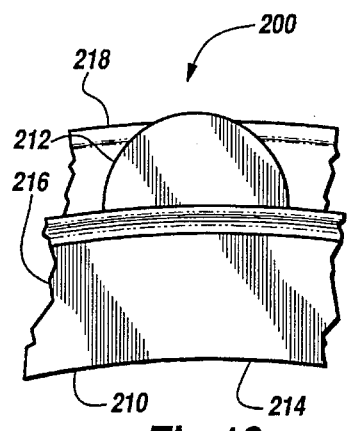
FIG. 16 is a fragmentary outside elevational view of the valve liner of FIG. 14.
Figure 17:
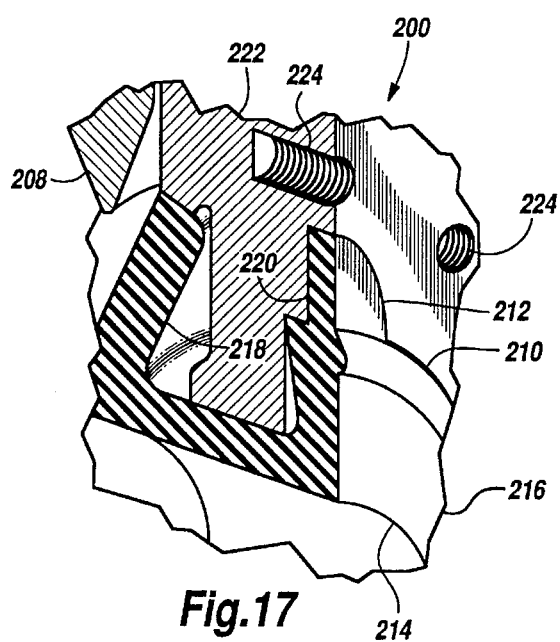
FIG. 17 is a fragmentary isometric view of the valve liner of FIG. 14 in place within a valve housing.

To minimize the effect of passing the gate over the gap 206 between the ends 204 of the spring 202, the gap is preferably oriented to the same position with respect to the housing for all installations. For example, to position the gap so that it experiences the low initial deflection at the onset of gate entry, it would be desirable to position the gap at the top of the valve assembly 200 directly beneath the gate 208. In order to insure that the valve liner 210 is properly oriented, a protruding locator tab 212 is molded with the valve body 214 to extend radially from the exterior valve flange 216. The locator tab 212, best shown in FIGS. 15 and 16, is spaced axially from the gap 206. The split ring spring 220 is entirely embedded in the inner flange 218 of the liner 210 and it is thus not visible to installer. Hence the locator tab provides a visual outward indication of the orientation of the split ring spring 202. As shown in FIG. 17, a machined depression or pocket 220, corresponding in shape to the locator tab 212, is formed on the exterior of the valve housing 222. The locator tab 212 provides an obvious indication to the user that the liner 210 assembles to the valve body in only one orientation. Because the tab 212 protrudes from the outer periphery of the liner, it is not likely to be overlooked during the assembly process. Furthermore, the tab 212 is not engaged by the pipe flange, and thus does not present the possibility of interfering with a proper seal between the pipe flange and the housing. Also, because the tab extends out beyond the pipe flange, it is also visible after assembly for purposes of verifying proper installation.

The locator tab 212 is illustrated on a wafer style or narrow body valve assembly 200. However, it should be noted that a locator tab may also be provided in a wide body valve. Narrow body valves are narrower than the full body valve, and thus may offer reduced cost due to reduced material consumption. As shown in FIG. 17, the narrow body valve assembly 200, allows the pipe flange to be connected directly to the housing, and will have a number of tapped blind holes 224 for pipe flange attachment fasteners (not shown).

Furthermore, although in a preferred embodiment the tab is positioned opposite the gap, it may be positioned at any angular location, as it will be in a fixed position with respect to the gap, and thus the pocket 220 may be positioned at any corresponding location. In addition, if visual assembly orientation alone is sufficient, indicia such as a printed, raised, or recessed arrow may be provided on the exterior or interior flange or other part of the valve liner 210 to aid in correct installation. Although the locator tab has been disclosed as semicircular, it may be formed in a variety of other suitable shapes. Furthermore, if desired the gap and the locator tab may be positioned at the bottom of the valve assembly.

It should be noted that in certain applications it will be desirable to adjust the gate travel such that the gate is parked in a closed position with the blade entirely through the seat inserts. For example, in flue gas desulfurization applications where lime slurry is being piped, there is a danger that materials left within the seat inserts will be subject to consolidation and hardening. To prevent dewatered material from solidifying it would be desirable to completely expel this material from the housing by cycling the gate to protrude beneath the seat inserts. In such special applications it may be necessary to accept a certain amount of cycling discharge in order to prevent setting of retained material.

It should further be noted that although the housing halves have been disclosed above as weldments comprised of assembled elements, the housing halves may also be formed as unitary castings. Furthermore, although a hydraulic gate actuator has been described above, a pneumatic, electromechanical or geared handwheel actuator may also be employed. Additionally, in certain applications the split seat insert portions may be formed integrally with the valve liners.

It is understood that the invention is not limited to the particular embodiments disclosed and illustrated herein, but embraces such modified forms thereof as come within the scope of the following claims.

We claim:

1. A valve liner for positioning within a gate valve assembly having two body housing members, wherein each housing member has portions defining a through passage, and wherein the housing members are connected together to define a passage therethrough, and wherein the connected housing members define a clearance for the passage of a gate between the housing members, and wherein each housing member has portions defining an abutment spaced axially outwardly from said clearance and radially outwardly of said through passage; wherein the valve liner comprises:

a) a resilient liner body, the body having portions defining an axial flow passage therethrough;

b) an inner flange which extends radially outwardly from the body;

c) an outer flange which is spaced axially from the inner flange, and which extends radially outwardly from the body; and d) a frustoconical spring member with portions which extend into the inner flange, wherein two valve liners are positionable within body housing members, such that the valve liner inner flanges face one another to engage the gate when it is lowered between the two valve liners, and wherein said radially extending portions of each inner flange extends axially to engage one of said housing member abutments, the spring member urging the valve liner inner flange into engagement with the gate.

2. The valve liner of claim 1 wherein the frustoconical spring member is formed of a section of bar stock to have two ends which are spaced from one another.

3. The valve liner of claim 2 further comprising indicia positioned on the valve liner to indicate the location of at least one of said spring member ends.

4. The valve liner of claim 3 further comprising two opposed seat inserts engagable with the body members beneath the valve liners, wherein the seat inserts are formed of an elastomer and are independent of the valve liners, such that the gate in the lowered position extends between the seat inserts.

5. The valve liner of claim 3 further comprising a locator tab extending axially from the outer flange, wherein the locator tab engages with a depression in a valve housing member to fix the location of the spring member ends.

6. A gate valve assembly comprising:

a) two body housing members, wherein each housing member has portions defining a through passage, and wherein the housing members are connected together to define an axial passage therethrough, and wherein the connected housing members define a clearance for the passage of a gate between the housing members, and wherein each housing member has portions defining an abutment spaced axially outwardly from said clearance and radially outwardly of said through passage;

b) two resilient valve liners engaged with the body housing members, wherein the valve liners have portions defining a coaxial flow passage through the housing members, and wherein each valve liner has an inner flange with radially extending portions, said radially extending portions of each inner flange extending axially to engage one of said housing member abutments;

d) two frustoconical spring members, one formed within each valve liner, wherein each spring member has portions which extend within said valve liner inner flange, wherein each spring member is formed with two ends which are spaced from one another; and e) a gate mounted to the housing members for selected interposition between the valve liners, wherein the gate is moveable between a raised position in which flow through the valve assembly is permitted and a lowered position in which the gate extends into the split seat portions and flow is blocked, and wherein the valve liner flanges are engaged with one another when the gate is raised, and wherein the spring members bias portions of the valve liners into engagement with the gate when the gate is interposed between the valve liners.

7. The gate valve assembly of claim 6 further comprising indicia positioned on the valve liner to indicate the location of at least one of said spring member ends.

8. The gate valve assembly of claim 7 further comprising:

a) portions of at least one housing member which define an axially extending pocket; and b) a locator tab extending axially from the outer flange, wherein the locator tab engages with said housing member pocket to fix the location of the spring member ends with respect to the housing member.

9. The valve assembly of claim 6 further comprising two opposed seat inserts engaged with the body members beneath the valve liners, wherein the seat inserts are formed of an elastomer and are independent of the valve liners, such that the gate in the lowered position extends between the seat inserts.

10. A gate valve assembly comprising:

a) two body housing members, wherein each housing member has portions defining a through passage, and wherein the housing members are connected together to define an axial passage therethrough;

b) portions of each housing member which define a seat insert slot beneath the housing passage, and wherein the connected housing members define an opening beneath the seat insert slots, said opening communicating between the seat insert slots and the environment exterior to the valve assembly;

c) two resilient valve liners engaged with the body housing members, wherein the valve liners have portions defining a coaxial flow passage through the housing members;

d) an imperforate gate mounted to the housing members for selected interposition between the valve liners, wherein the gate is moveable between a raised position above the valve liners in which flow through the valve assembly is permitted and a lowered position extending between the two valve liners in which flow is blocked; and e) an elastomer seat insert engaged within each body seat insert slot, wherein the seat inserts are independent of the valve liners and entirely below the valve liners, said seat inserts forming a liquid-tight seal with one another in the valve open position, and wherein the gate in the lowered position extends between the seat inserts, and wherein particulate matter which passes through the engaged seat inserts escapes to the valve exterior through said housing opening.

11. The valve assembly of claim 10 wherein each seat insert has an inner entry bevel, such that the opposed seat inserts define a beveled entry for the gate.

* * * * *